(12) United States Patent
Liao

(10) Patent No.: US 8,484,817 B2
(45) Date of Patent: Jul. 16, 2013

(54) DISMOUNTING DEVICE FOR ENVIRONMENT-FRIENDLY OIL FILTER

(75) Inventor: Po Lin Liao, Taichung (TW)

(73) Assignee: Lih Yann Industrial Co., Ltd., Taichung (TW)

( * ) Notice: Subject to any disclaimer, the term of this patent is extended or adjusted under 35 U.S.C. 154(b) by 278 days.

(21) Appl. No.: 13/095,222

(22) Filed: Apr. 27, 2011

(65) Prior Publication Data

US 2012/0210570 A1 Aug. 23, 2012

(30) Foreign Application Priority Data

Feb. 18, 2011 (TW) .............................. 100202967 U

(51) Int. Cl.
*B23P 6/00* (2006.01)
*E01B 9/02* (2006.01)

(52) U.S. Cl.
USPC .............................. 29/244; 29/270; 29/283.5

(58) Field of Classification Search
USPC ...................... 29/244, 270, 281.1, 283.5, 700
See application file for complete search history.

(56) References Cited

U.S. PATENT DOCUMENTS

| | | | |
|---|---|---|---|
| 2004/0040136 A1* | 3/2004 | Joshi et al. ................. | 29/407.01 |
| 2012/0199613 A1* | 8/2012 | Demarest et al. ......... | 222/402.13 |
| 2012/0205302 A1* | 8/2012 | Palmer ..................... | 210/167.11 |
| 2012/0210570 A1* | 8/2012 | Liao ................................ | 29/700 |
| 2012/0267365 A1* | 10/2012 | Sabounjian ....................... | 220/6 |
| 2013/0025740 A1* | 1/2013 | Osten ................................ | 141/1 |

* cited by examiner

*Primary Examiner* — Lee D Wilson
(74) *Attorney, Agent, or Firm* — Muncy, Geissler, Olds & Lowe, PLLC

(57) ABSTRACT

A dismounting device is provided for efficiently and effectively dismounting an environment-friendly oil filter from an engine. The device includes an oil storage container that forms an oil discharge mouth and includes an oil guide tube extending into an internal oil storage space thereof. The oil guide tube has an exposed upper end carrying a pusher in which a central bore is defined and communicating the internal oil storage space of the container. The pusher has an upper portion forming a threaded section that is engageable with an internal thread of an oil discharge opening of the oil filter and a push tube extendable into the oil filter to open an internal valve of the oil filter so that oil remaining in the filter is allowed to flow into the central bore of the pusher and is conducted by the oil guide tube into the oil storage space of the container.

3 Claims, 6 Drawing Sheets

DISMOUNTING DEVICE FOR ENVIRONMENT-FRIENDLY OIL FILTER

BACKGROUND OF THE INVENTION

1. Field of the Invention

The present invention relates to the field of oil filter dismounting tools, and in particular to a dismounting device for environment-friendly oil filter that effectively removes residue of oil from inside the filter in dismounting an environment-friendly oil filter and thus eliminates potential risk of causing pollution.

2. The Related Arts

To reduce wear of internal parts of an automobile engine during the operation thereof, an oil pump is provided at one side of the automobile engine and an oil filter is mounted to the oil pump, whereby the oil pump withdraws oil from a bottom of the engine and drives the oil to the oil filter, where the oil is filtered and sent back to the engine to lubricate the internal parts of the engine. Under normal conditions, the oil filter will gradually get blocked and must be periodically replaced. A conventional oil filter is structured in such a way that the whole filter assembly, including the filter and filter paper received in the filter, must be completely replaced with a new assembly. This makes a waste and causes pollution to the surroundings.

Recently, an environment-friendly oil filter is available in the market, by which the replacement can be realized by dismounting the oil filter, replacing the filter paper received therein, and then re-mounting the filter. This helps environmental conservation and reduces maintenance costs. However, a certain amount of oil residue, which is approximately 300 cc, remains in the filter after the filter is dismounted. A commonly adopted solution is to puncture a drainage port formed in a bottom of the oil filter with for example a screwdriver to release the oil residue from inside the filter. This certainly causes contamination to the surroundings and also damages the drainage port of the filter, which will lead to potential risk of oil leaking from the oil filter.

Thus, it is desired to provide a dismounting device for the environment-friendly oil filter in order to overcome the above-discussed problems.

SUMMARY OF THE INVENTION

The problem to be addressed by the present invention is that although replacing an environment-friendly oil filter can be realized through dismounting the oil filter from an automobile engine, replacing the filter paper received in the oil filter, and then re-mounting the filter back to the automobile engine and although such a process helps conserving the environment and reducing maintenance costs, yet a certain amount of oil residue, which is approximately 300 cc, often remains in the filter after the filter is dismounted. The solution that is commonly adopted to handle such a problem is to puncture a drainage port formed in a bottom of the environment-friendly oil filter with for example a screwdriver to release the oil residue from inside the oil filter. This causes contamination to the surroundings and also damages the drainage port of the oil filter, which will lead to potential risk of oil leaking from the oil filter.

To solve such problems and drawbacks, the present invention provides a dismounting device for environment-friendly oil filter, which comprises an oil storage container, an oil guide tube, and a dismounting tool. The oil storage container has a top, which forms, in a side portion thereof, an oil discharge mouth that is openably closed by a cover and also forms, in an opposite side portion of the top, a through hole that has an internal thread to extend into and communicate a receiving space formed in the oil storage container. The oil storage container forms in a side surface thereof a recessed compartment that selectively receives and keeps the dismounting tool therein. The recessed compartment has an inner circumference forming a plurality of ribs for engaging and thus retaining the dismounting tool therein. The inner circumference of the recessed compartment also forms two troughs that are formed by recessing the circumference at opposite locations for selectively receiving a user's fingers therein to forcibly removing the dismounting tool out of the compartment. A closure plug forms a through hole that receives the oil guide tube to extend therethrough. The closure plug forms an external thread that is engageable with and thus fixed to the internal thread of the through hole of the oil storage container. A positioning cap is fit to a lower end of the oil guide tube. A pusher has an outer circumferential surface forming a driving ring and grip grooves. The pusher has an upper portion that forms a circular push tube connected to the pusher by an expanded threaded cylindrical section. The push tube forms an open slot, preferably at a location close to the threaded section, to communicate a central bore that extends through the pusher. The pusher has a lower portion forming a connection tube for fitting to an upper end of the oil guide tube. As such, the threaded section of the pusher is engageable with an internal thread formed in a discharge opening of an environment-friendly oil filter so that the push tube is inserted into the environment-friendly oil filter to open a valve located inside the environment-friendly oil filter, allowing oil remaining in the environment-friendly oil filter to flow to the open slot of the pusher in a substantially complete manner. The oil is then conducted through the open slot into the central bore of the pusher and then flows through the oil guide tube into the internal receiving space of the oil storage container. No contamination caused by leaking oil may occur.

As compared to the known technology, the dismounting device for environment-friendly oil filter according to the present invention comprises a dismounting tool that is attachable to a hand tool for efficiently dismounting an environment-friendly oil filter at any time and any site. The environment-friendly oil filter has an oil discharge opening that forms therein an internal thread engageable by the threaded section of the pusher of the dismounting device, so that the push tube of the pusher is inserted into the oil filter to open an internal valve of the oil filter, allowing oil remaining in the environment-friendly oil filter to flow through the open slot into a central bore of the pusher to be conducted by the oil guide tube into the internal receiving space of the oil storage container to eliminate potential risk of oil contaminating the surroundings.

BRIEF DESCRIPTION OF THE DRAWINGS

The present invention will be apparent to those skilled in the art by reading the following description of a preferred embodiment thereof, with reference to the attached drawings, wherein.

DETAILED DESCRIPTION OF THE PREFERRED EMBODIMENT

The present invention provides a dismounting device for environment-friendly oil filter.

To provide a better understanding of objectives, features, and functions of the present invention, an explanation of an embodiment according to the present invention will given with reference to the attached drawings.

Figure 1:
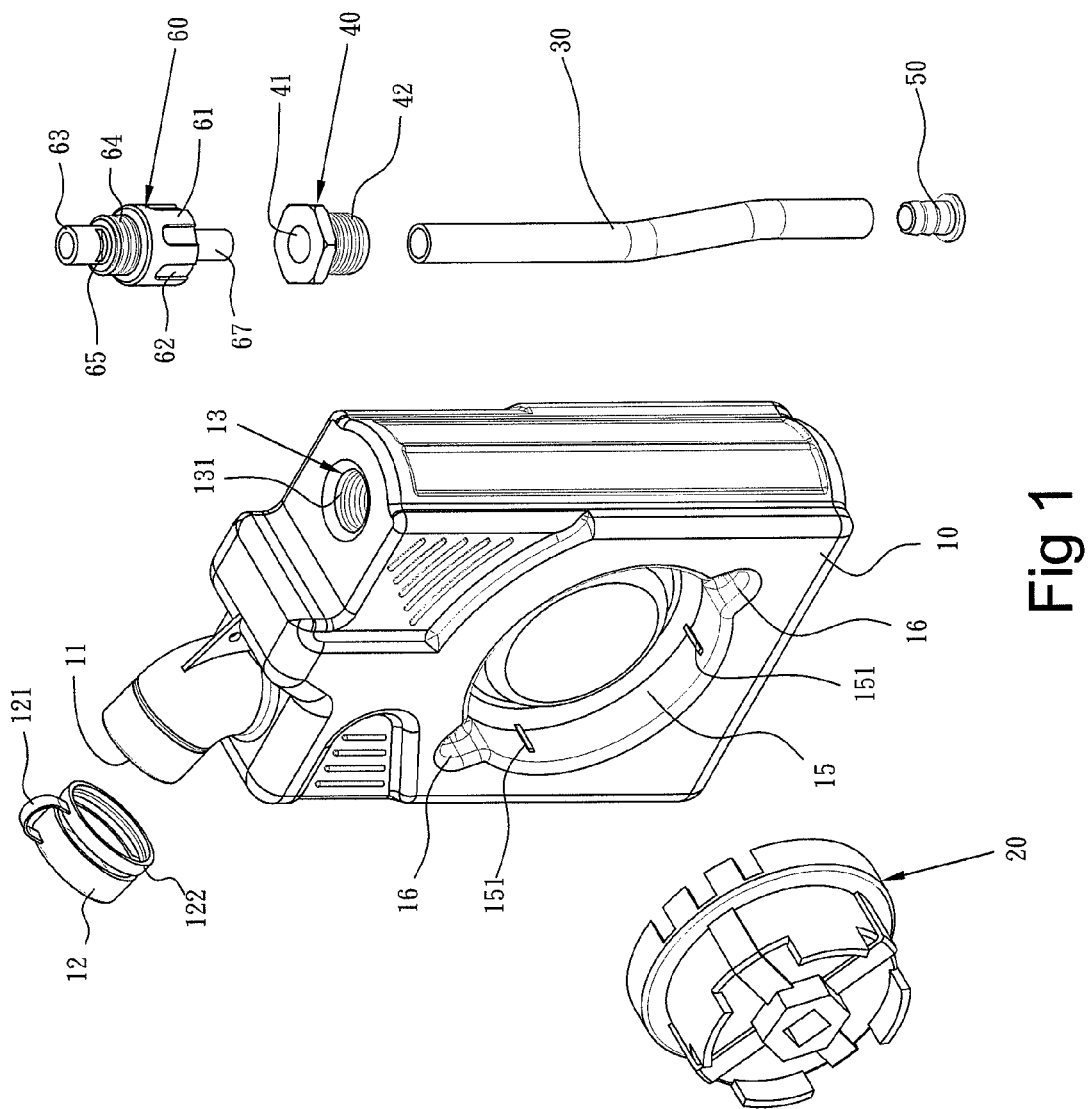
FIG. 1 is a perspective view, in an exploded form, showing a dismounting device for environment-friendly oil filter according to an embodiment of the present invention.
Figure 2:
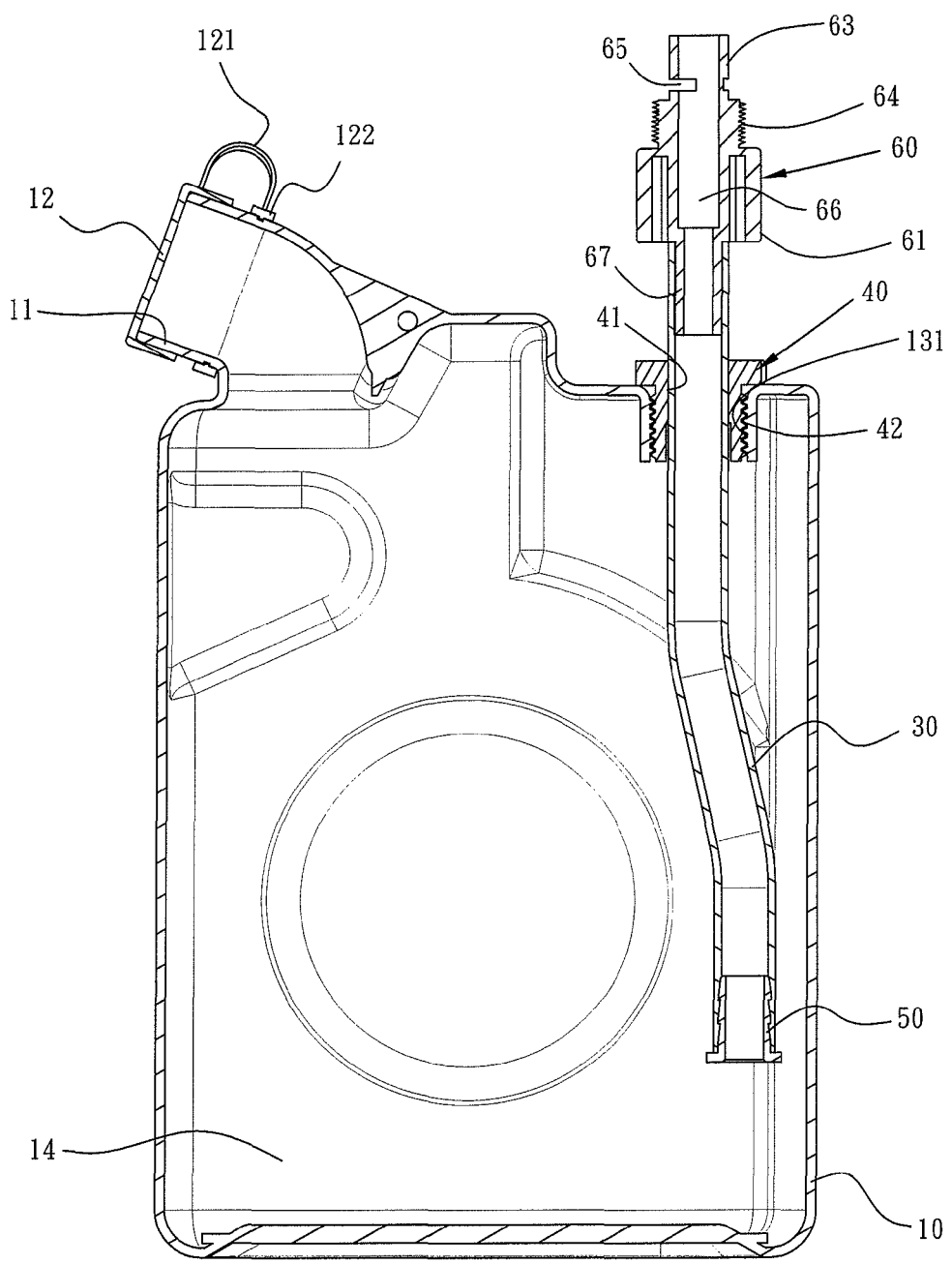
FIG. 2 is a cross-sectional view, in an assembled form, showing the dismounting device for environment-friendly oil filter according to the present invention.

Reference is made to FIGS. 1 and 2, which are a perspective view, in an exploded form, and a cross-sectional view, in an assembled form, of a dismounting device for environment-friendly oil filter according to the present invention. The dismounting device for environment-friendly oil filter according to the present invention comprises an oil storage container 10, a socket-like dismounting tool 20, an oil guide tube 30, a closure plug 40, a positioning cap 50, and a pusher 60, which will be described in detail as follows.

The oil storage container 10 has a top, which forms, in a side portion thereof, an opening serving as an oil discharge mouth 11. The oil discharge mouth 11 is openably closed by a cover 12. The oil storage container 10 forms, in an opposite side portion of the top thereof, a through hole 13 that has an internal thread 131 to extend into and communicate a receiving space 14 formed in the container.

Figure 5:
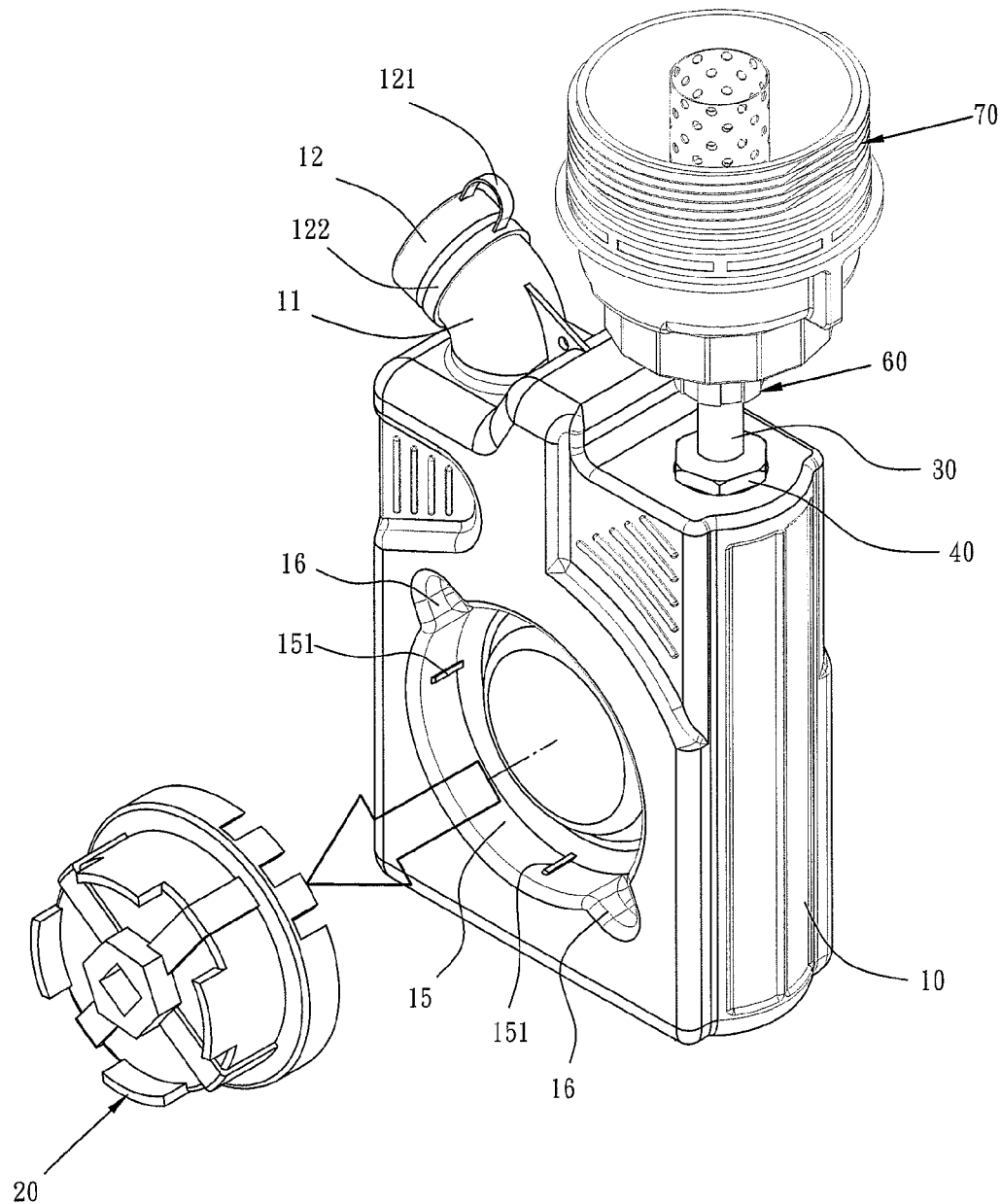
FIG. 5 is a perspective view illustrating removal of a dismounting tool from the dismounting device according to the present invention.

The dismounting tool 20 can be fit to a hand tool for dismounting an environment-friendly oil filter 70 shown in FIG. 5. The oil storage container 10 forms in a side surface thereof a recessed compartment 15 that selectively receives the dismounting tool 20 to fit therein. The recessed compartment 15 has an inner circumference forming a plurality of ribs 151 for tightly engaging and thus retaining the dismounting tool 20 therein. The inner circumference of the recessed compartment 15 also forms two troughs 16 that are formed by recessing the circumference at opposite locations for selectively receiving a user's fingers therein to forcibly removing the dismounting tool 20 out of the compartment 15 for use and to allow the dismounting tool 20 to be re-fit into and retained in the compartment.

The closure plug 40 forms a through hole 41 that receives the oil guide tube 30 to extend therethrough. The closure plug 40 forms an external thread 42 that is engageable with and thus fixed to the internal thread 131 of the through hole 13 of the oil storage container 10.

The positioning cap 50 is fit to a lower end of the oil guide tube 30 for preventing undesired separation of the oil guide tube 30 when the oil guide tube 30 is pulled upwards.

The pusher 60 has an outer circumferential surface forming a driving ring 61 and a plurality of grip grooves 62. The pusher 60 has an upper portion that forms a circular push tube 63 connected to the pusher 60 by an expanded threaded cylindrical section 64. The push tube 63 forms an open slot 65, preferably at a location close to the threaded section 64, to communicate a central bore 66 that extends through the pusher 60. The pusher 60 has a lower portion forming a connection tube 67 for fitting to an upper end of the oil guide tube 30.

Figure 4:
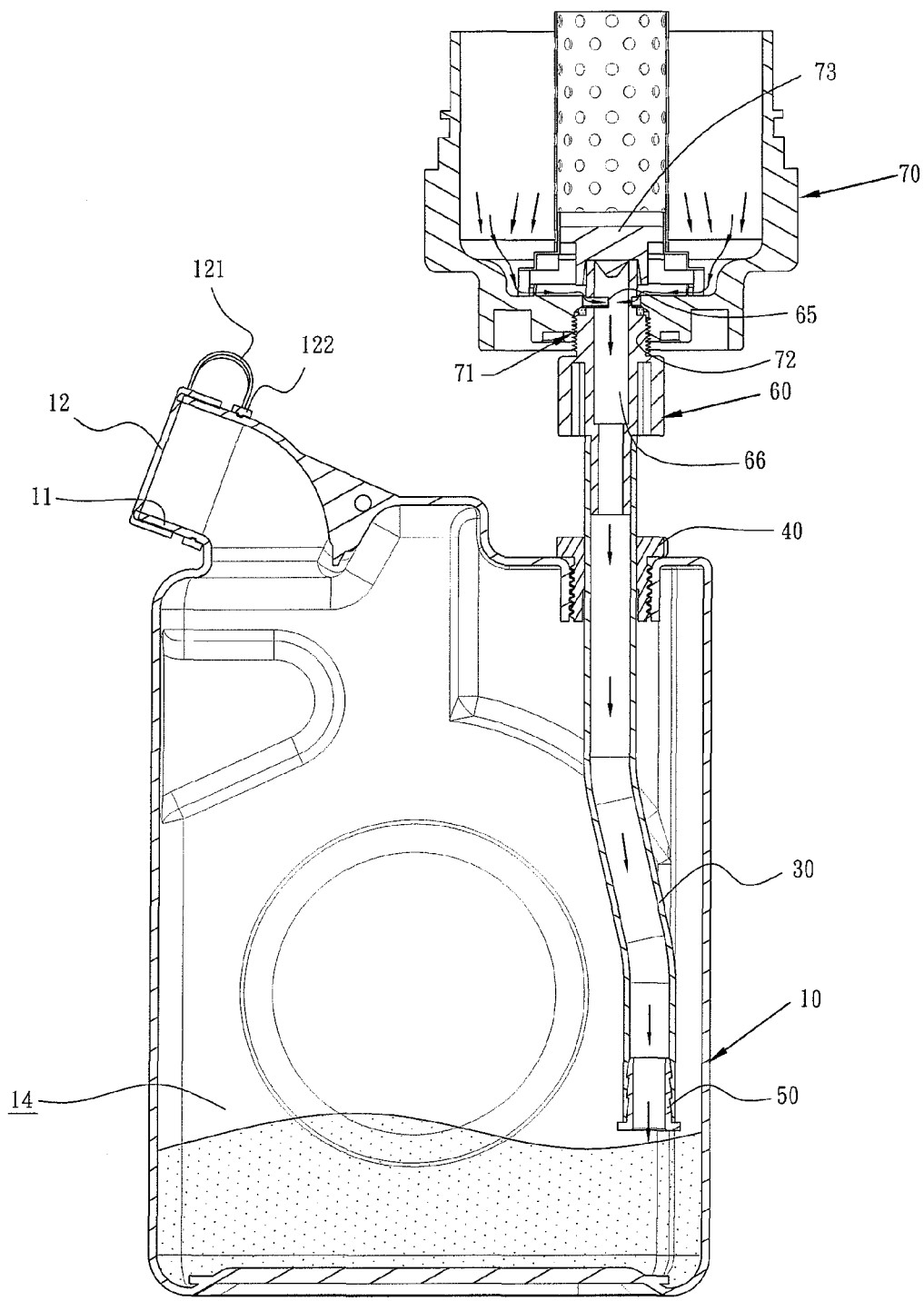
FIG. 4 is a cross-sectional view illustrating an operation of oil drainage from an environment-friendly oil filter with the dismounting device according to the present invention.

Referring to FIG. 4, an environment-friendly oil filter 70 has a drainage port that forms a discharge opening 71 having an internal thread 72 engageable with and thus securely coupleable with the threaded section 64 of the pusher 60, whereby the push tube 63 is inserted into the environment-friendly oil filter 70 to open a valve 73 located inside the environment-friendly oil filter 70. Oil remaining in the environment-friendly oil filter 70 that flows toward a lower portion of the filter may reach the open slot 65 of the pusher 60 that is now located at the lowest position inside the filter, whereby substantially all the oil remaining in the filter is conducted through the open slot 65 into the central bore 66 of the pusher 60, and then flows through the oil guide tube 30 into the internal receiving space 14 of the oil storage container 10. Contamination caused by leakage of the oil will not occur.

Figure 6:
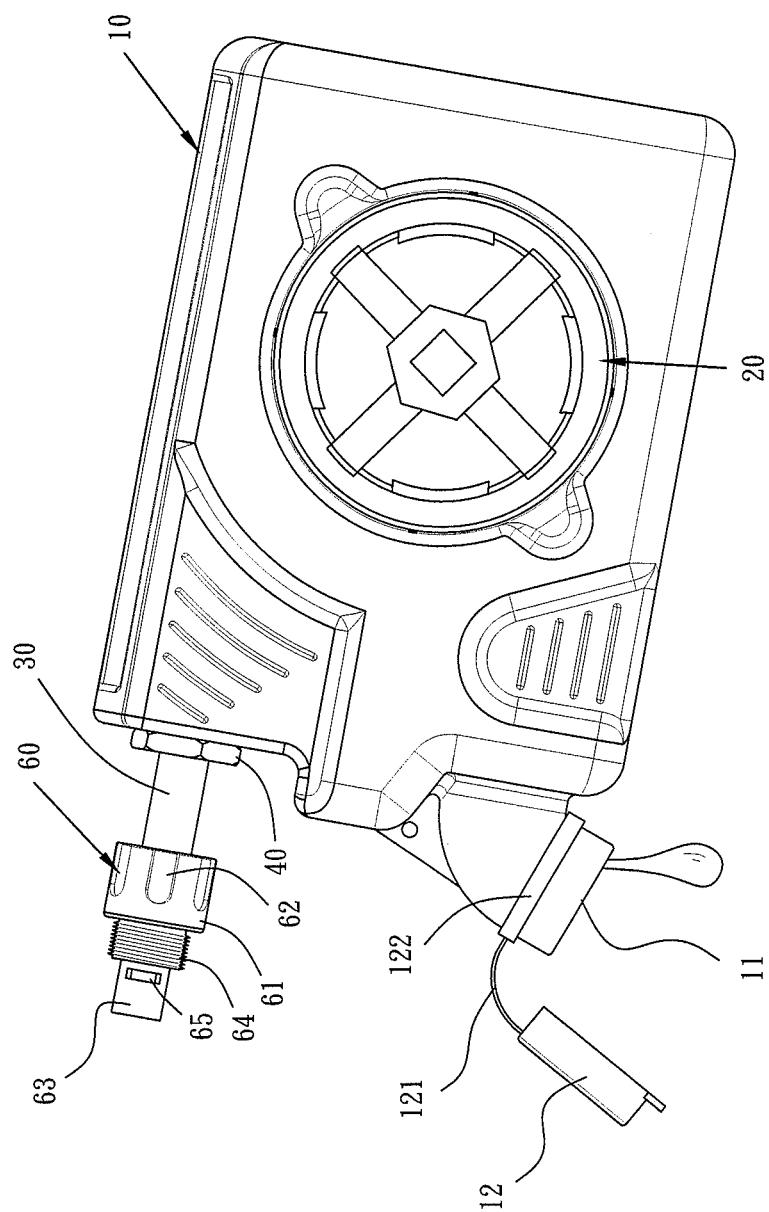
FIG. 6 is a perspective view showing pouring out oil collected in the dismounting device according to the present invention.

Referring to FIG. 6, the oil discharge mouth 11 of the oil storage container 10 is closable by a cover 12. The cover 12 comprises a connection tab 121 that is connected to a ring 122, and the ring 122 is fit around and attached to an outer circumference of the oil discharge mouth 11 of the oil storage container 10. After the cover 12 is detached to open the mouth and the oil storage container 10 is tilted, the oil that collected in the receiving space 14 of the oil storage container 10 (see FIG. 4) can be poured into a large preservation tank.

Figure 3:
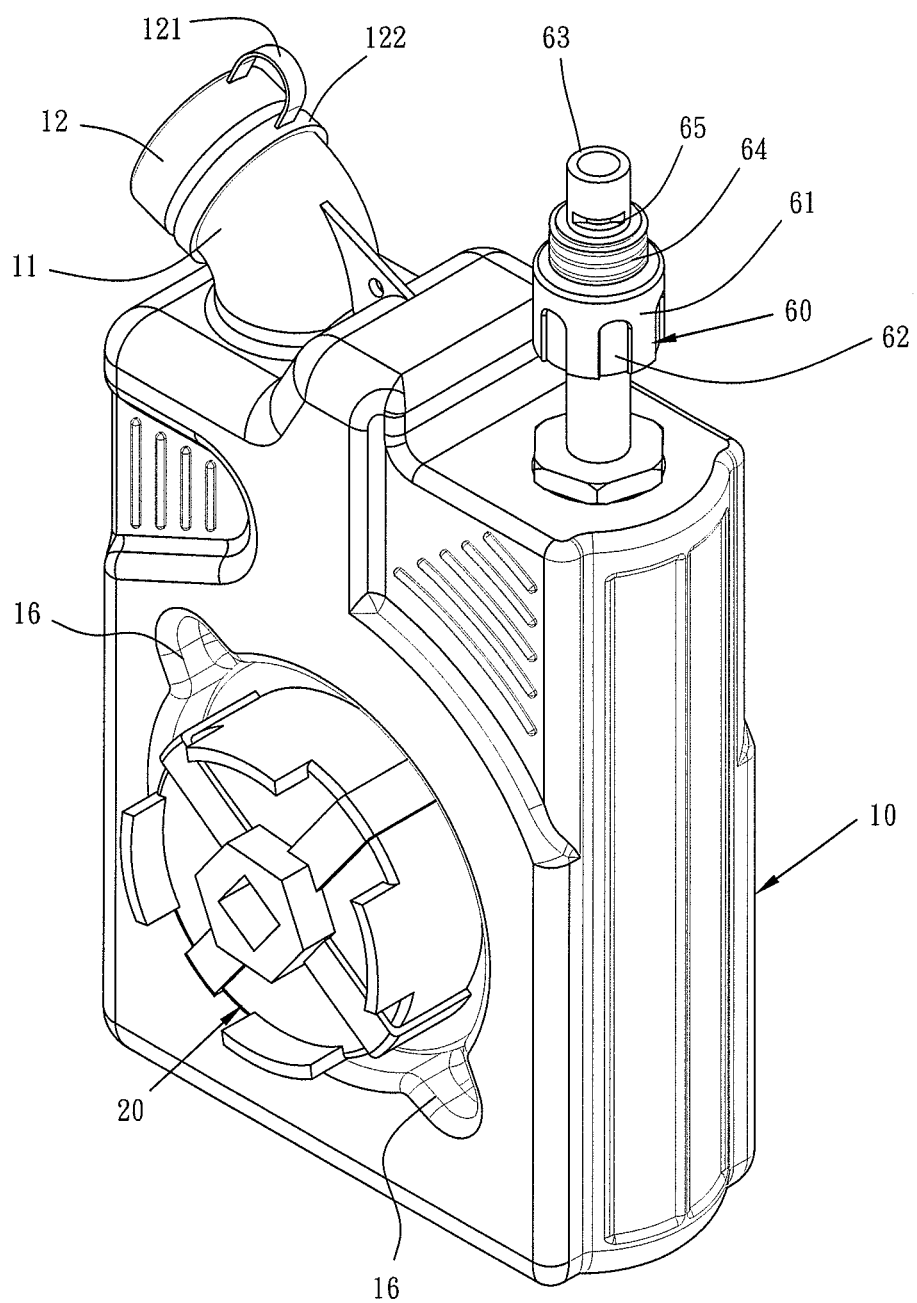
FIG. 3 is a perspective view, in an assembled form, showing the dismounting device for environment-friendly oil filter according to the present invention.

Referring to FIGS. 3-5, the present invention provides a dismounting device for environment-friendly oil filter, wherein the oil storage container 10 forms a recessed compartment 15 that functions to receive and temporarily retain therein the dismounting tool 20 to prevent the dismounting tool 20 from being lost and to allow the tool to be timely accessed for dismounting an environment-friendly oil filter 70. To dismount the environment-friendly oil filter 70 and replace the filter paper contained therein, the pusher 60 that is provided on the oil guide tube 30 is attached to the environment-friendly oil filter 70 through threading engagement of the threaded section 64 with the internal thread 72 of the oil filter, whereby the push tube 63 pushes away and opens the valve 73 of the environment-friendly oil filter 70 to allow the oil residue inside the environment-friendly oil filter 70 to flow to the open slot 65 of the pusher 60, where the oil completely passes through the open slot 65 to get into the central bore 66 of the pusher 60 to be conducted by the oil guide tube 30 into the internal receiving space 14 of the oil storage container 10. After the oil residue is all drained, the pusher 60 is detached from the environment-friendly oil filter 70.

Referring to FIG. 5, the dismounting tool 20 can then be detached from the oil storage container 10 and attached to the environment-friendly oil filter 70. And a hand tool is applied to the dismounting tool to dismount the environment-friendly oil filter 70 from the automobile engine in order to replace the filter paper contained in the filter. After the replacement of the filter paper, the environment-friendly oil filter 70 is re-mounted back to the automobile engine to complete the operation. The dismounting tool 20 is then re-fit into the recessed compartment 15 of the oil storage container 10 to be kept therein.

The present invention provides the following advantages:

(1) The present invention provides a dismounting device for environment-friendly oil filter that is of a novel structure to allow of complete collection of drained oil without causing pollution to the surroundings and damage to the environment-friendly oil filter; further, the dismounting tool can be safely kept in a fixed site to allow of timely and easy access and there is no concern of loss of the tool.

(2) The present invention provides a dismounting device for environment-friendly oil filter that is of a unique structure comprising an oil guide tube and a pusher attached to a top end of the oil guide tube, wherein the pusher helps pushing away and opening a valve of environment-friendly oil filter to allow the oil remaining in the filter to flow to an open slot defined in a lower site of the pusher for being conducted into the oil storage container, in order to eliminate the potential risk of oil pollution or damage of the environment-friendly oil filter; further, the dismounting tool is retained on a side surface of the oil storage container and this allows of easy access and eliminate the concern of loss of the dismounting tool.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A dismounting device for dismounting an environment-friendly oil filter, the dismounting device comprising:

an oil storage container, which has a top forming in a side portion thereof an oil discharge mouth and also forming in an opposite side portion thereof a through hole that has an internal thread and extends into and communicates a receiving space formed in the oil storage container;

a dismounting tool, which is adapted to fit to a hand tool for dismounting the environment-friendly oil filter, the dismounting tool being receivable in and retained by a recessed compartment formed in a side surface of the oil storage container, the recessed compartment having an inner circumference forming a plurality of ribs for engaging and thus retaining the dismounting tool, the inner circumference of the recessed compartment being selectively recessed to form troughs that are adapted to receive a user's fingers to forcibly removing the dismounting tool out of the compartment for use and to allow the dismounting tool to be re-fit into and retained in the compartment;

an oil guide tube;

a closure plug, which forms a through hole that receives the oil guide tube to extend therethrough and also forms an external thread that is engageable with and thus fixed to the internal thread of the through hole of the oil storage container;

a positioning cap, which is fit to a lower end of the oil guide tube for preventing undesired separation of the oil guide tube when the oil guide tube is pulled upwards; and a pusher, which has an outer circumferential surface forming a driving ring and has an upper portion that forms a push tube connected to the pusher by an expanded threaded section, the push tube forming an open slot communicating a central bore that extends through the pusher, the pusher having a lower portion forming a connection tube that is fit to an upper end of the oil guide tube whereby the threaded section of the pusher is engageable with an internal thread formed in a discharge opening of the environment-friendly oil filter so that the push tube is inserted into the environment-friendly oil filter to open a valve located inside the environment-friendly oil filter, allowing oil remaining in the environment-friendly oil filter to flow to the open slot of the pusher in a substantially complete manner, the oil being then conducted through the open slot into the central bore of the pusher and then flowing through the oil guide tube into the internal receiving space of the oil storage container.

2. The dismounting device as claimed in claim 1, wherein the oil discharge mouth of the oil storage container is closable by a cover, the cover comprising a connection tab connected to a ring, which is fit around and attached to an outer circumference of the oil discharge mouth of the oil storage container.

3. The dismounting device as claimed in claim 1, wherein the driving ring formed on the outer circumference of the pusher comprises a plurality of grip grooves.

* * * * *